(12) United States Patent
Shidham

(10) Patent No.: US 11,828,690 B2
(45) Date of Patent: Nov. 28, 2023

(54) CYTOLOGY CELL BLOCK PREPARATION DEVICES AND METHODS OF CELL BLOCK PREPARTAION USING SAME

(71) Applicant: Anjani Shidham, Grosse Ile, MI (US)

(72) Inventor: Anjani Shidham, Grosse Ile, MI (US)

( * ) Notice: Subject to any disclaimer, the term of this patent is extended or adjusted under 35 U.S.C. 154(b) by 1425 days.

(21) Appl. No.: 16/119,065

(22) Filed: Aug. 31, 2018

(65) Prior Publication Data

US 2020/0072713 A1  Mar. 5, 2020

(51) Int. Cl.
| | |
|---|---|
| *G01N 1/00* | (2006.01) |
| *G01N 1/36* | (2006.01) |
| *G01N 1/28* | (2006.01) |
| *G01N 1/40* | (2006.01) |

(52) U.S. Cl.
CPC .............. *G01N 1/36* (2013.01); *G01N 1/2813* (2013.01); *G01N 1/4077* (2013.01); *G01N 2001/2846* (2013.01); *G01N 2001/368* (2013.01)

(58) Field of Classification Search
None
See application file for complete search history.

(56) References Cited

U.S. PATENT DOCUMENTS

| | | | | |
|---|---|---|---|---|
| 4,167,875 A | * | 9/1979 | Meakin ................. | B01D 29/05 73/863.25 |
| 6,309,605 B1 | * | 10/2001 | Zermani ............. | B01L 3/50255 422/535 |
| 2018/0238876 A1 | * | 8/2018 | Sundrehagen ... | G01N 33/56972 |

* cited by examiner

*Primary Examiner* — Jyoti Nagpaul
(74) *Attorney, Agent, or Firm* — Standley Law Group LLP; Adam J. Smith

(57) ABSTRACT

Exemplary embodiments of the inventive concept are directed to devices for facilitating the creation of pathology cell blocks and to methods for creating such cell blocks using said devices. Various cell block preparation devices are described, which cell blocks may be comprised of various media and may be provided with one or multiple wells for receiving and retaining tissue/cell specimens, such as cytology specimens. The tissue/cell specimen laden cell block preparation devices are treated with fixative to produce cell block specimens that are highly amenable to sectioning and subsequent analysis according to known methods. A marker may be integrated into any of the cell block preparation devices to guide a technologist during sectioning and subsequent application of cell block sections to slides for proper orientation of the cell block sections.

15 Claims, 5 Drawing Sheets

CYTOLOGY CELL BLOCK PREPARATION DEVICES AND METHODS OF CELL BLOCK PREPARTAION USING SAME

TECHNICAL FIELD

The exemplary embodiments described herein are directed to devices for facilitating the creation of quantitatively and qualitatively improved pathology cell blocks and to methods for creating such cell blocks using said devices.

BACKGROUND

Pathology is, generally speaking, the study of the causes and effects of diseases, including through the analysis of tissue samples. Cytology is a branch of pathology that typically involves the study of single cells or small clusters of cells, which are often obtained via different types of tissue samples, including but not limited to a sample of body fluid. Cytology specimens may be obtained by a variety of techniques such as brushing, scraping, aspiration of body fluids, and fine needle aspiration (FNA) of different lesions—techniques that are normally less invasive than a tissue biopsy.

As one of skill in the art would understand, cell blocks are routinely used in pathology. These cell blocks broaden the diagnostic value of cytology specimens and are complementary to cytology preparations. Cell blocks can assist an analyst in making a correct diagnosis so that an associated patient can be treated appropriately with minimal side effects for a variety of diseases, including but not limited to cancers and infections. There is an ever increasing need for better cell blocks due to the continuing evolution of molecular tests for improved personalized therapies.

Various methods for preparing cell blocks are described in literature, but said methods are frequently modified according to "home grown protocols", which are typically far removed from any standardized method. Consequently, the quality of cell blocks produced using currently practiced techniques varies significantly, resulting in invariably poor diagnostic outcomes. These frequent suboptimal outcomes tend to introduce a level of frustration relative to the use of cell blocks, which is undesirable given the potential benefits of their use.

While various home grown cell block preparation protocols exist, the general concept is fundamentally the same. Generally speaking, small fragments of tissue, small cell groups, and/or single cells (i.e., "specimens") are collected and placed into a container with a preservative solution, the specimen-solution mixture is concentrated, and the sediment pellet formed from the concentrated mixture is processed by cutting it into thin sections for subsequent analysis. Thus, in brief, cell blocks currently used in pathology are typically comprised of "micro biopsies" embedded in paraffin.

More specifically, known cell block making techniques typically require multiple steps that ultimately result in the formation of a cell block. A known hot preparation method, for example, requires the melting of a gel and subsequent mixing of the melted gel with a specimen of interest. The gel-specimen mixture eventually becomes a solid cell block that can be further processed. In a few known cold preparation methods, a gel-specimen mixture is solidified by reaction at room temperature (e.g., fibrin clot from plasma/fibrinogen with Thrombin; or alginate solidification by Calcium ions). The solidified mixture forms a cell block that may be further processed. A collodion bag preparation method is also known and involves concentrating a specimen in a collodion bag and subsequent processing of the wrapped bag as a cell block.

Unfortunately, there are problems with each of these known cell block preparation methods. Particularly, the diagnostic specimen material tend to be randomly distributed within the cell block when using any of the aforementioned hot, cold or collodion bag cell block forming methods. This results in a greater chance that the specimen material will be missed when processing the final sections of the block, especially when the specimen material is scant.

There have been occasional past efforts to improve the cell block preparation process by providing ready-made components and associated cell block preparation methods. However, all past efforts have been adversely affected by an inability to provide for precise control over the tiny micro fragments of tissue, small cell groups, and single cells that are used to create the cell block.

A few approaches using a specially designed automated instrument requiring capital investment have been made available. However, cell block preparation methods using these methods are affected by significant qualitative and quantitative limitations related to exposure of the specimen to fixatives/reagents, which do not match up with routine biopsy tissue processing of formalin-fixed paraffin embedded (FFPE) tissue and may lead to potentially false results with potential compromising of correct diagnostic and prognostic misinterpretations leading to expensive over-treatment or under-treatment and even death. Cell block preparation methods using said instrument are also similar to so far available home grown alternatives due to a lack of guidance relative to selection of an appropriate first cell block section with potentially higher number of diagnostic specimen components.

Also, even though automated, the aforementioned known instrument is relatively slow and not suitable for high outputs. Thus, the current automated option is not a practical or efficient solution to the cell block preparation problem, especially for large laboratories.

It can be understood from the foregoing remarks, that there is a heretofore unmet need for an improved device and method for preparing pathology cell blocks. Exemplary device and method embodiments described and shown herein fulfill this need.

SUMMARY

Exemplary embodiments of the inventive concept envisage a cell block preparation device and associated method of use that can overcome known cell block preparation drawbacks such as, but not limited to, non-standardized techniques, suboptimal and non-reproducible results, and the waste of resources, time, and money associated with conventional methodologies and technologies that produce said suboptimal and non-reproducible results. Exemplary embodiments of the inventive concept also provide an easy to use and adopt solution that does not require significant capital investment and achieves precision in organizing the diagnostic specimen material at the level of sections.

In comparison to the known cell block preparation techniques described above, exemplary embodiments of the inventive concept allow for concentration of diagnostic specimen material along the cell block cutting surface by permeation via gravity or by centrifugation into a preformed dry, porous cell block preparation device, or by gravity or centrifugation into a preformed non-porous, dry or wet gel cell block preparation device. Whether porous or non-porous, exemplary cell block preparation devices may be provided in the form of a disc, although other shapes are also possible. Exemplary embodiments of the inventive concept also permit the use of any fixation/processing protocol. This allows processing of the cell blocks similar to that of known formalin fixed tissue specimens, without compromising the qualitative integrity of the diagnostic specimen material. Thus, exemplary embodiments of the inventive concept are able to achieve a qualitative and quantitative improvement over known devices and techniques, and with reproducible results.

Furthermore, exemplary cell block preparation techniques do not require the time consuming and clumsy preparation of gels or media. For example, the heating and melting of the gel during a known hot method of cell block preparation, such as those based on agar/gelatin, may have clumsy challenges including exploding of the gel through the associated heating tubes during heating/microwaving. Exemplary embodiments of the inventive concept overcome such inconveniences and uncertainties—including the required procurement of different components used in the chosen method and their standardization for proper compatibility with each other—by making use of novel, preformed and ready to use gel discs.

Exemplary cell block preparation devices further offer visual clues to a technologist cutting the cell block sections on the microtome machine through the use of a precisely located and easily visible marker that is built into the cell block preparation device. The marker is aligned at the level of concentrated diagnostic specimen material, and allows a histotechnologist cutting the cell blocks to precisely monitor the depth of the cutting so as to best catch the level of section with concentrated diagnostic specimen material.

While the aforementioned and currently available automated option concentrates the diagnostic specimen material by vacuum, it does not have a built-in marker. The automated option protocol also requires a step of adding alcohol to retain the cells in a concentrated area, which interferes with the qualitative integrity of the diagnostic material.

The simplicity of the steps associated with preparing a cell block using an exemplary cell block preparation device and corresponding preparation method further allows for a significant decrease in preparation time, while simultaneously generating high-quality, reproducible cell blocks that facilitate the harvesting of a maximum number of diagnostic micro-fragments/cells present in the specimen. Exemplary device and method embodiments also afford the benefit of utilizing a variety of fixatives, including but not limited to, the commonly used/recommended formalin (water solution of formaldehyde) fixative. Thus, it can be understood that exemplary devices and methods of the inventive concept increase the versatility of cell block preparation methodologies, and require only easy to follow steps that minimize the learning curve commonly associated with new methods.

Exemplary cell block preparation devices of the inventive concept may be provided in different forms and in different shapes.

In accordance with one non-limiting exemplary embodiment, the cell block preparation device may be a micro cell block preparation device.

In accordance with another non-limiting exemplary embodiment the cell block preparation device may be a nano cell block preparation device.

In accordance with still another non-limiting embodiment the cell block preparation device may be an ultra-nano cell block preparation device.

An exemplary cell block preparation device may be comprised of a shape-retentive dry, porous material.

An exemplary cell block preparation device may be comprised of a shape-retentive dry, non-porous material.

An exemplary cell block preparation device may be comprised of a shape-retentive wet, non-porous gel material.

The most appropriate type of cell block preparation device to be used in creating a given cell block depends largely on the proportion of tissue micro-fragments/cells in the concentrated specimen in the concentrated specimen to the volume of the supernatant. Guidelines for cell block preparation device selection are provided below.

Other aspects and features of the inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and.

DETAILED DESCRIPTION OF THE EXEMPLARY EMBODIMENTS

Exemplary cell block preparation devices according to the inventive concept may be provided in various formats. For example, a "micro" version of an exemplary cell block preparation device may be most appropriately used when tissue/cell samples having higher concentrations of tissue fragments (also known as diagnostic micro fragments (DMFs) are available. A "nano" or "ultra-nano" version of an exemplary cell block preparation device may be most appropriately used when tissue/cell samples have lower concentrations of DMFs. The selection of a micro, nano or ultra-nano cell block preparation device may be guided, but not necessarily limited, by the table below.

| Cell Block Preparation Device Type | Volume of Concentrated Specimen | Tissuecrit % of Concentrated Specimen | Remarks |
|---|---|---|---|
| Micro | More than 0.5 ml | 50% | Centrifugation not required. The liquid portion of the concentrated specimen is absorbed via diffusion and gravity into the absorbent pad below the preformed disc. |
| Nano | Any volume, but preferably more than 0.5 ml | Any | Centrifuge preferably with free swinging cups (not fixed angle) for the best results. |
| Ultra-Nano | Any volume, but preferably more than 200 μl | Any | Centrifuge preferably with free swinging cups (not fixed angle) for the best results. | where "Tissuecrit" is the proportion of the total volume of DMFs/cells in the concentrated specimen to the volume of the supernatant, expressed as a percentage.

Figure 1C:
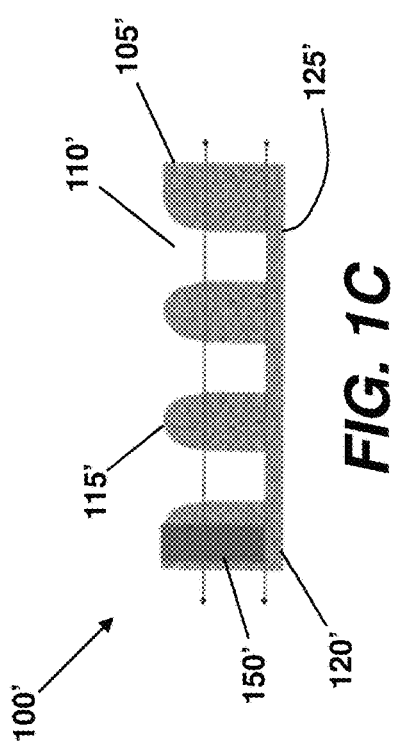
FIG. 1C is an a cross-sectional view of a possible alternative construction to the cell block preparation device configuration shown in FIG. 1B.
Figure 1A:
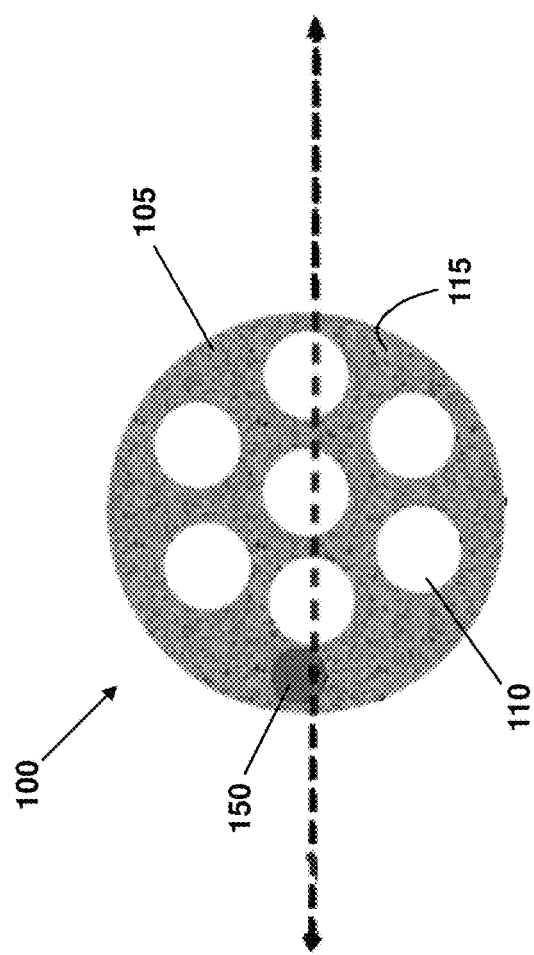
FIG. 1A is a top plan view of an exemplary cell block preparation device in the form of preformed media disc comprised of a shape-retentive, dry, porous medium and having a plurality of tissue/cell collection wells.
Figure 1B:
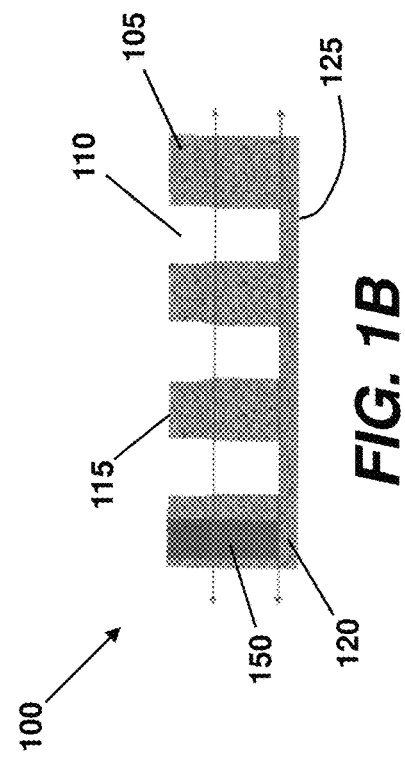
FIG. 1B is a cross-sectional view of the device of FIG. 1A, taken along the section line indicated in FIG. 1A.

One exemplary embodiment of a micro cell block preparation device 100 according to the inventive concept is represented in FIGS. 1A-1B. As may be observed, the micro cell block preparation device 100 is presented generally in the form of a disc-shaped body (hereinafter "disc" for brevity) 105 within which is located a plurality of tissue/cell collection wells 110. In this particular example, there are seven collection wells 110, but a different number of collection wells may be present in other embodiments.

The tissue/cell collection wells 110 extend to some depth from a top surface 115 of the disc 105, but do not extend through a base portion 120 of the disc, which is defined between the bottoms of the wells and a bottom surface 125 of the disc 105. Therefore, the collection wells 110 of the micro cell block preparation device 100 are able to retain DMFs, cells, and associated liquids.

As indicated above, the micro version of the cell block preparation device 100 would typically be used for specimens having greater concentrations of DMFs. This exemplary micro cell block preparation device 100 is formed from a porous dry medium that may be comprised of, for example, various organic/synthetic polymers that are able to sufficiently maintain the stable form of the cell block preparation device 100 even after various subsequent processing steps described in more detail below. The porous medium from which the exemplary cell block preparation device 100 is made may allow for DMF accumulation within micro-spaces of the device material in addition to accumulation within the collection wells 110. DMF accumulation within micro-spaces of the disc material may result in more DMF for sampling in the final paraffin sections of the processed cell block (see below).

An alternative version of the cell block preparation device 100 of FIGS. 1A-1B is illustrated in FIG. 10. This alternative cell block preparation device 100' is very similar to the cell block preparation device 100, and again includes a disc-shaped body 105' within which is located a plurality of tissue/cell collection wells 110' that extend to a depth so as to define a base portion 120' of the disc between the bottoms of the wells and a bottom surface 125' of the disc 105'. As may be observed, however, the entrance areas of the collection wells 110' and the surrounding top surface 115' of this exemplary cell block preparation device 100' have a different shape than the wells 110 and top surface 115 of the cell block preparation device 100 of FIGS. 1A-1B.

Figure 2B:
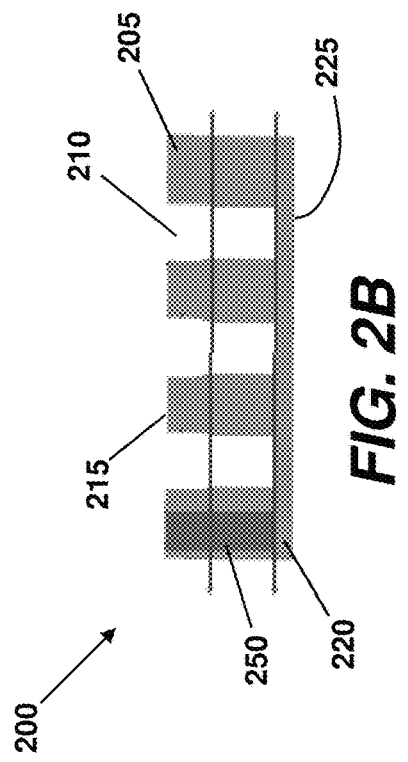
FIG. 2B is a cross-sectional view of the device of FIG. 2A, taken along the section line indicated in FIG. 2A.
Figure 2A:
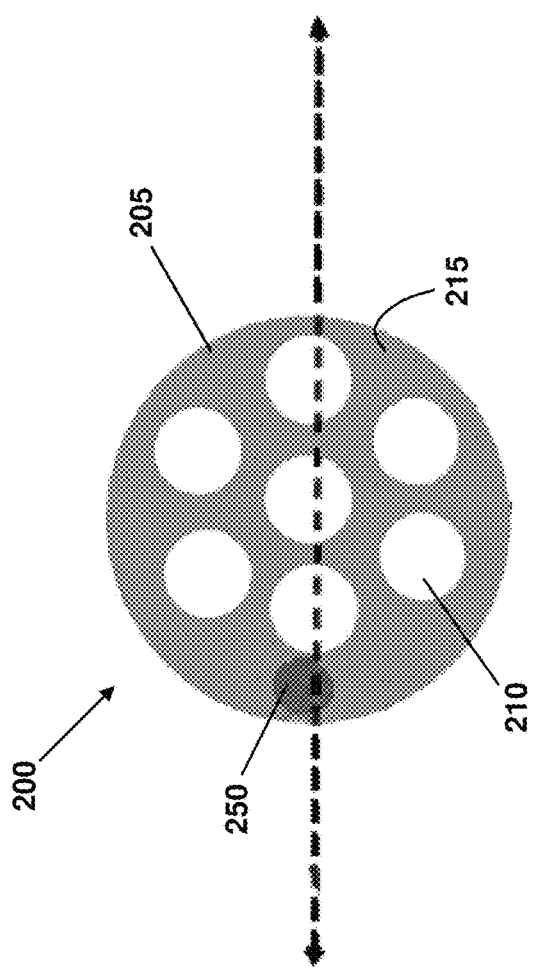
FIG. 2A is a top plan view of another exemplary cell block preparation device in the form of a preformed media disc comprised of a shape-retentive, dry or wet, non-porous medium and having multiple tissue/cell collection wells.

One exemplary embodiment of a nano cell block preparation device 200 according to the inventive concept is represented in FIGS. 2A-2B. As may be observed, this exemplary nano cell block preparation device 200 is also presented generally in the form of a disc 205 within which is located multiple tissue/cell collection wells 210. The tissue/cell collection wells 210 extend to some depth from a top surface 215 of the disc 205, but do not extend through a base portion 220 of the disc, which forms the bottoms of the wells. Therefore, the collection wells 210 are able to retain DMF, cells, and associated liquids.

Figure 3A:
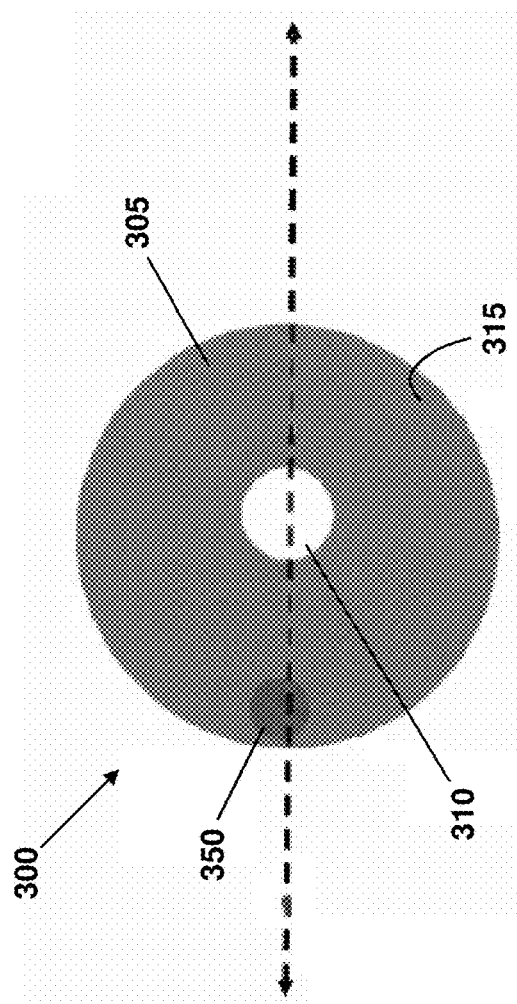
FIG. 3A is a top plan view of another exemplary cell block preparation device in the form of a preformed media disc comprised of a shape-retentive, dry or wet, non-porous medium and having a single tissue/cell collection well.
Figure 3B:
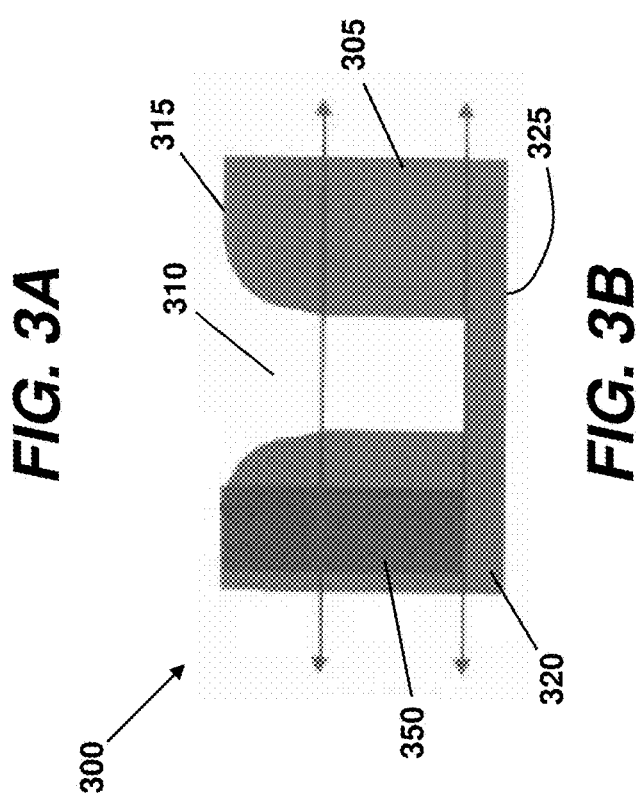
FIG. 3B is a cross-sectional view of the device of FIG. 3A, taken along the section line indicated in FIG. 3A.

One exemplary embodiment of an ultra-nano cell block preparation device 300 according to the inventive concept is represented in FIGS. 3A-3B. As may be observed, this exemplary ultra-nano cell block preparation device 300 is also presented generally in the form of a disc 305. However, unlike the micro dell block device 100 of FIGS. 1A-1B and the nano cell block preparation device of FIGS. 2A-2B, the exemplary ultra nano cell block preparation device 300 includes only a single tissue/cell collection well 310. The tissue/cell collection well 310 extends to some depth from a top surface 315 of the disc 305, but does not extend through a base portion 320 of the disc, which forms the bottom of the well. Therefore, the collection well 310 of the ultra nano cell block collection device is also able to retain DMF, cells, and associated liquids.

As indicated above, the nano 200 and ultra-nano 300 versions of an exemplary cell block preparation device would typically be used for specimens having lesser levels of DMF, as explained above. Exemplary nano/ultra-nano cell block preparation devices 200, 300 may be formed from a dry or wet non-porous medium comprised of, for example, various organic or synthetic polymers or polymeric gels that are able to sufficiently maintain the stable form of the nano/ultra-nano cell block preparation device 200, 300 even after various subsequent processing steps described in more detail below. Non-limiting examples of such gel materials include polysaccharides, starch, gelatin, and alginate.

A nano/ultra-nano cell block preparation device comprised of an organic or synthetic polymer or polymeric gel, such as the exemplary nano cell block preparation device 200 of FIGS. 2A-2B and the exemplary ultra-nano cell block preparation device 300 of FIGS. 3A-3B, may further include, for example, a specialized container to facilitate proper accumulation of DMF in the tissue/cell collection well(s) 210, 310 following centrifugation (see below). Said container is adapted to allow the final nano/ultra-nano cell block specimen with trapped DMF to be dislodged from the bottom of the container for subsequent final harvesting and tissue processing. The specialized container may also include a transport fluid to maintain the nano/ultra-nano cell block preparation device with wells and marker in a wet condition during transport/storage and until the specimen is used for testing or reaches its final expiry date. One exemplary embodiment of such a container 400 is depicted in FIGS. 4A-4D.

Figure 4B:
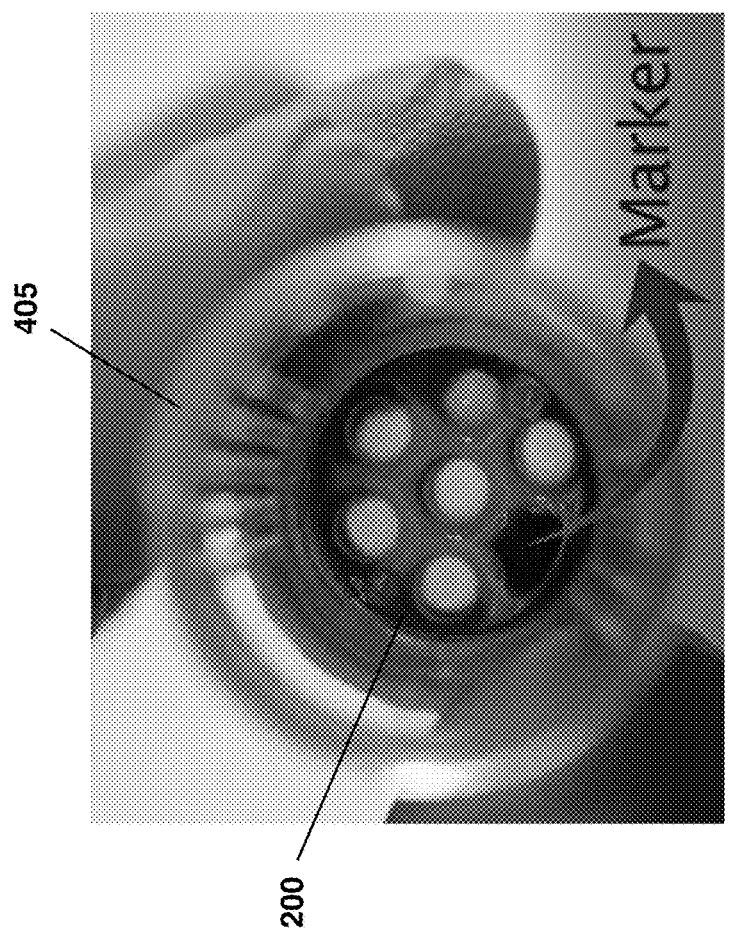
FIG. 4B illustrates one exemplary cell block preparation device comprised of a shape-retentive dry or wet non-porous medium after placement into the exemplary container of FIG. 4A and the introduction of a tissue/cell specimen thereto.
Figure 4A:
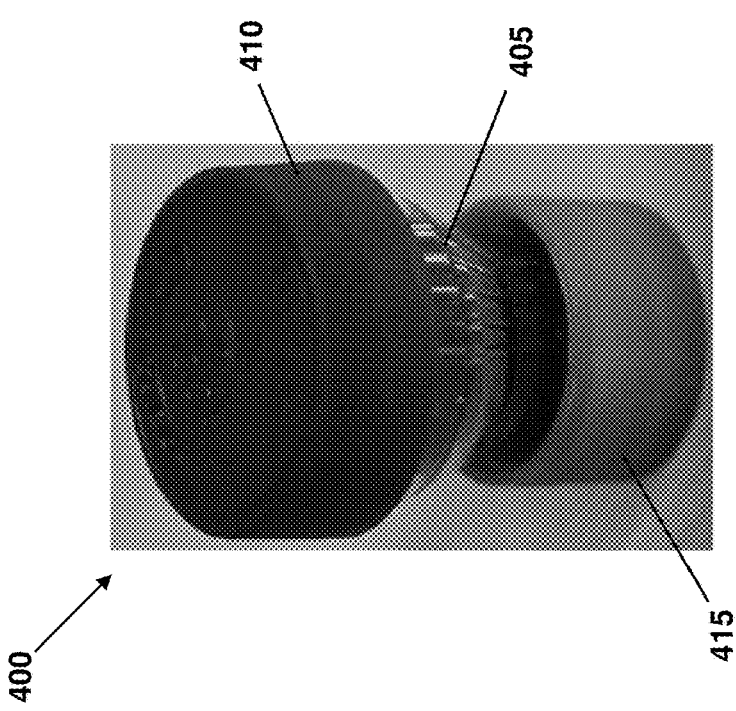
FIG. 4A depicts one exemplary embodiment of a specialized container for use in the centrifugation of an exemplary cell block preparation device comprised of a shape-retentive dry or wet non-porous medium.
Figure 4D:
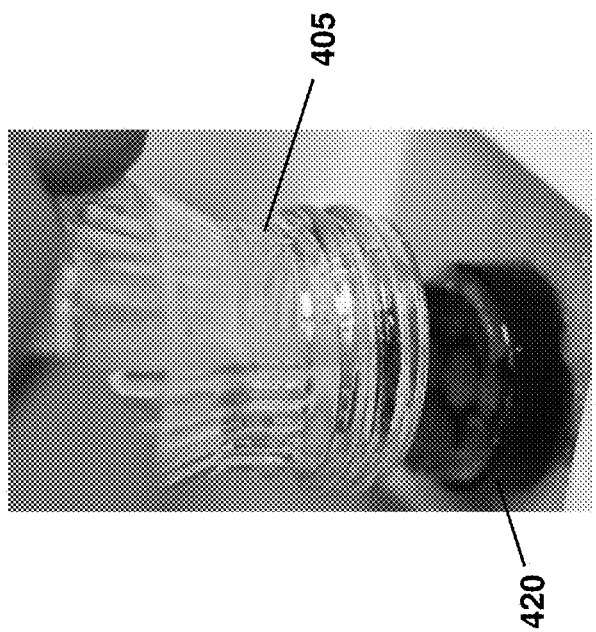
FIGS. 4C-4D represent the process of removing the exemplary cell block preparation device of FIG. 4B from the exemplary container subsequent to centrifugation.
Figure 4C:
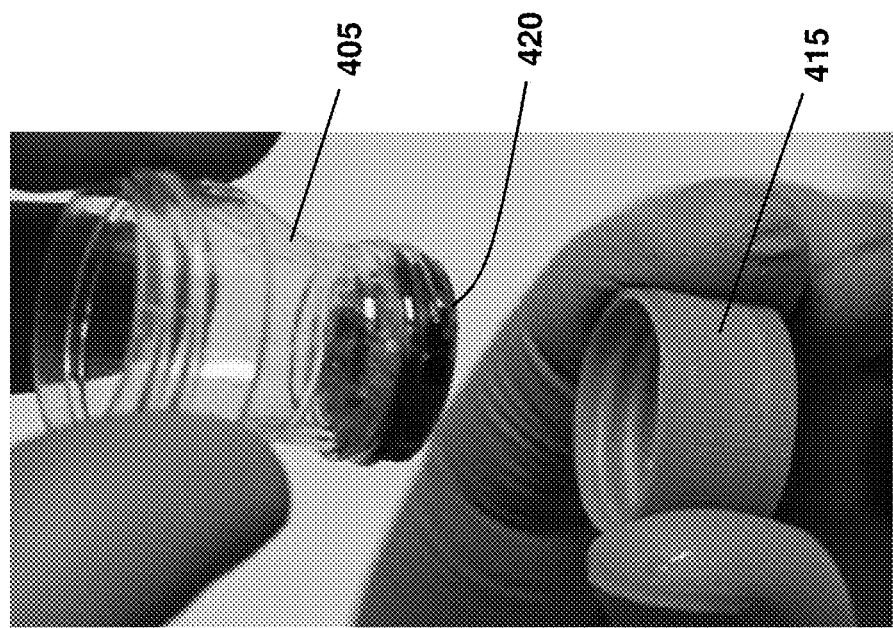

As indicated in FIGS. 4A-4D and mentioned above, the exemplary container 400 is designed to retain a nano or ultra-nano cell block preparation device during addition of specimen material thereto, as well as during the centrifuging process. Consequently, as shown in FIG. 4A, the exemplary container 400 includes a receptacle portion 405 having opposite open ends, as well as a removable top cap 410 and a removable bottom cap 415 that are respectively associated with said open ends. As represented in FIG. 4B, with the top cap 410 removed and the bottom cap 415 in place, a nano or ultra-nano cell block preparation device may be installed in the receptacle 405 and specimen material may be subsequently added to the cell block preparation device. The top cap 410 may thereafter be reinstalled for centrifuging. Once the centrifuging process is complete, at least the bottom cap 415 may be removed to facilitate extraction of the resulting sediment concentrated specimen 420 from the receptacle 405, as represented in FIGS. 4C-4D.

Depending on the material from which an exemplary cell block preparation device is comprised, the tissue/cell collection wells/well and other features of the cell block preparation device may be formed by molding or engraving said wells and/or other features into a block of selected media. Other forming methods suitable to the material used to form a given cell block preparation device may also be employed. As may be observed particularly in FIG. 2B, the upper, entrance portions, of the tissue/cell collection wells 110, 210 may be provided with a shape/configuration that helps to guide sample material into the wells.

The exact size of a given cell block preparation device may vary, and may be dictated at least to some degree by other cytology laboratory equipment. Typically, however, the base portion at the bottom of the wells of an exemplary cell block preparation device will be between about 100 to 1,000 microns in thickness. Also, while the exemplary cell block preparation devices shown in FIGS. 1A-1B and 2A-2B are disc-shaped (round), it is possible to produce cell block preparation devices of other shapes if desired.

As can be observed in the drawing figures, each of the exemplary cell block preparation devices 100, 200 further includes a marker 150, 250, 350 that is used to help control the depth of sectioning during subsequent processing of a cell block specimen created with one of the exemplary cell block preparation devices. Particularly, the marker is preferably a dark colored or otherwise readily visible indicator that is incorporated into an exemplary cell block preparation device. The marker may be a colored material that is dissimilar to the color of the surrounding cell block preparation device material, so as to be visible therein. The material forming the marker may be colored cell block preparation device material or may be another material that is embedded in the cell block preparation device material so as to be a properly located part of the preformed cell block preparation device. In any case, the marker 150, 250, 350 is preferably located such that the bottom surface of the marker and the bottom(s) of the well(s) of the cell block preparation device lie in substantially the same plane (i.e., are at the same level within the cell block preparation device). Thus, during a sectioning phase of cell block specimen preparation, the marker will appear as soon as sectioning proceeds past the base portion of the cell block and reaches the bottom(s) of the well(s). The marker serves as a guide that affords a technologist more precise and objective control over the sectioning operation to help avoid loss of scant DMF/cells due to specimen over-cutting and/or creating section(s) without any DMF/cells due to undercutting.

The use and location of such a marker 150, 250, 350 also aids in slide preparation after specimen sectioning. Particularly, because the marker will appear in the same location of each cell block specimen section, the marker location may be used to properly orient the sections on different slides in an identical fashion, which facilitates precise evaluation of test event(s) on the same cells or cell groups in different serial sections, which facilitates the application of a Subtractive Coordinate Immunoreactivity Pattern (SCIP) approach to enhance immuno-profiling results.

The accumulation/dispersal of DMFs and cells into the wells of an exemplary cell block preparation device may be achieved by natural gravity or centrifugation. In any case, the collected DMFs are preferably stabilized in the cell block preparation device medium with the help of a supporting medium such as, but not limited to, soluble proteins present naturally in the specimens or added as a supplement.) Such supporting mediums may be gelled/denatured by any fixative selected by user, or by a sol-gel system.

Exemplary cell block preparation devices according to the inventive concept may be used with virtually any fixative, and may be used even with tissue/cell specimens already collected in fixative. The ability to select virtually any fixative is highly beneficial and, of course, permits use of the usually recommended/used 10% buffered formalin fixative, which is important with reference to the application of generated cell blocks for various tests such as immunohistochemistry, in situ hybridization, molecular tests, and a variety of special stains and studies.

The concentration of specimens in a focused manner in the wells of the exemplary preformed discs would allow for coring out of concentrated diagnostic specimen material from any or all of the wells. This may be useful for any ancillary tests, including but not limited to molecular studies.

Exemplary cell block preparation device embodiments according to the inventive concept can be used in any general laboratory without the need for special instruments or other equipment. Exemplary cell block preparation device embodiments according to the inventive concept are suitable to low throughput or high throughput applications, including high throughput applications that employ automation and special instrumentation.

An exemplary cell block preparation step when using an exemplary micro cell block preparation device initially involves preparing a tissue/cell specimen, which typically includes centrifuging and concentrating the tissue/cell specimen. The concentrated tissue/cell specimen is then added (e.g., drop-by-drop) to the wells of the micro cell block preparation device, preferably until all of the concentrated tissue/cell specimen is added to the wells or the wells are full. The micro cell block preparation device is then placed in a holder where it resides atop an absorbent pad and is allowed to settle for some amount of time such as, for example, approximately 10 minutes or until the micro cell block preparation device is soaked and without free flowing fluid. A fixative, such as but not limited to 10% formalin is then added, and the micro cell block preparation device is allowed to sit for an additional period of time (e.g., 10 minutes). The tissue/cell specimen-containing micro cell block preparation device is then subsequently transferred into a tissue cassette, the top of the micro cell block preparation device with concentrated sediments in the wells is preferably covered with tissue paper to close the tops of the wells so as to minimize the potential of cross contamination, further preferably packed between two layers of biopsy sponges in the tissue cassette, and then immersed gently in a fixative of choice in a horizontal position (i.e., with the collection wells facing up) for a period of typically more than 2 hours as per individual protocols. The micro cell block preparation device with concentrated and packed sediments in the wells/well is then processed using the tissue cassette according to known protocols, as would be understood by one of skill in the art.

An exemplary cell block preparation step when using an exemplary nano/ultra-nano cell block preparation device initially involves preparing a tissue/cell specimen, which typically includes centrifuging and concentrating the tissue/cell specimen. The concentrated tissue/cell specimen is then added (e.g., drop-by-drop) to the wells/well of the nano/ultra-nano cell block preparation device, which has been previously placed in the receptacle 405 of the specialized container 400. The container 400 with the tissue/cell specimen containing nano/ultra-nano cell block preparation device is then centrifuged. This cell block preparation device centrifuging step may be performed, for example, at about 2,000 RPM for about 3 to 5 minutes.

Subsequent to initial centrifuging of the nano/ultra-nano cell block preparation devicer, a fixative is added to the container 400 after discarding the separated supernatant, and centrifuging of the container 400 and captive nano/ultra-nano cell block preparation device is performed again. The additional centrifuging step may be performed, for example, at about 2,000 RPM for about 3 to 5 minutes.

Subsequent to the last centrifuging step, further separated supernatant is discarded into an appropriate waste container. The centrifuged nano/ultra-nano cell block preparation device is then removed by unscrewing the bottom cap 410 of the specialized container 400 and extracting the nano/ultra-nano cell block preparation device through the opening at the bottom of the container receptacle 405 (see, e.g., FIGS. 4C-4D). The extracted sediment-containing nano/ultra-nano cell block preparation device is then transferred to a tissue cassette and wrapped. The top of the nano/ultra-nano cell block preparation device with concentrated sediments in the wells/well is preferably covered with tissue paper to close the tops of the wells/well so as to minimize the potential of cross contamination, further preferably packed between two layers of biopsy sponges in the tissue cassette, and processed according to known protocols, as would be understood by one of skill in the art.

Throughout this specification the word "comprise", or variations such as "comprises", "comprising" or "comprised of", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The terms "micro", "nano" and "ultra-nano" are used herein merely for purposes of generally distinguishing between various exemplary embodiments, and are not to be taken as denoting or requiring any specific dimensional limitations, whether relative to an individual exemplary embodiment or between exemplary embodiments.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions, timing or quantities are only approximations and it is envisaged that values higher/lower than the numerical values assigned to the parameters, dimensions or quantities fall within the scope of the disclosure, unless there is a statement in the specification specific to the contrary.

While considerable emphasis has been placed herein on the specific features of the exemplary embodiments, it will be appreciated that many additional features can be added and that many changes can be made in the exemplary embodiments without departing from the principles of the disclosure. These and other changes in the exemplary embodiments of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A pathology cell block preparation device comprising:
   a substantially disc-shaped body having a top surface and a bottom surface, the disc-shaped body formed from a shape-retentive, dry, porous medium;
   a plurality of tissue/cell collection wells extending within the disc-shaped body from the top surface toward the bottom surface of the disc-shaped body;
   a base portion of the disc-shaped body defined between the bottom surface of the disc-shaped body and bottoms of the tissue/cell collection wells; and
   a marker integrated into the disc-shaped body, the marker having a bottom end that lies in the same plane as the bottoms of the tissue/cell collection wells.

2. The device of claim 1, wherein the dry, porous medium is an organic polymer.

3. The device of claim 1, wherein the dry, porous medium is a synthetic polymer.

4. The device of claim 1, wherein the dry, porous medium includes micro-spaces of a dimension sufficient to permit the accumulation therein of tissue and/or cells introduced into the tissue/cell collection wells.

5. The device of claim 1, wherein the base portion of the disc-shaped body is between about 100 to 1,000 microns in thickness.

6. The device of claim 1, wherein the marker is of a color that is dissimilar to the color of the surrounding dry, porous medium.

7. The device of claim 1, wherein the marker is formed from a material selected from the group consisting of a colored section of the dry, porous medium and a material other than the dry, porous medium, which material is embedded in the dry, porous medium.

8. The device of claim 1, wherein an entrance portion of the tissue/cell collection wells is shaped to help guide tissue/cell specimen material into the tissue/cell collection wells.

9. A pathology cell block preparation device comprising:
   a substantially disc-shaped body having a top surface and a bottom surface, the disc-shaped body formed from a shape-retentive, dry or wet, non-porous, medium;
   at least one tissue/cell collection well extending within the disc-shaped body from the top surface toward the bottom surface of the disc-shaped body;
   a base portion of the disc-shaped body defined between the bottom surface of the disc-shaped body and a bottom of the at least one tissue/cell collection well; and
   a marker integrated into the disc-shaped body, the marker having a bottom end that lies in substantially the same plane as the bottom of the at least one tissue/cell collection well.

10. The device of claim 9, wherein the substantially disc-shaped body is comprised of a material selected from the group consisting of an organic polymer, a synthetic polymer, an organic polymeric gel and a synthetic polymeric gel.

11. The device of claim 9, wherein multiple tissue/cell collection wells are present in the substantially disc-shaped body.

12. The device of claim 9, wherein the base portion of the disc-shaped body is between about 100 to 1,000 microns in thickness.

13. The device of claim 9, wherein the marker is of a color that is dissimilar to the color of the surrounding wet medium.

14. The device of claim 9, wherein the marker is formed from a material selected from the group consisting of a colored section of the dry or wet non-porous medium and a material other than the dry or wet non-porous medium, which material is embedded in the dry or wet non-porous medium.

15. The device of claim 9, wherein a single tissue/cell collection well is present in the substantially disc-shaped body.

* * * * *